(12) United States Patent
Dicarlo et al.

(10) Patent No.: US 8,411,162 B2
(45) Date of Patent: Apr. 2, 2013

(54) IMAGE PROCESSING METHODS AND SYSTEMS FOR FINE ART REPRODUCTION

(75) Inventors: Jeffrey M. Dicarlo, Menlo Park, CA (US); Miheer M. Bhachech, Mountain View, CA (US); Michael McGuire, Palo Alto, CA (US); Nitin Sampat, Rochester, NY (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2570 days.

(21) Appl. No.: 11/021,770

(22) Filed: Dec. 23, 2004

(65) Prior Publication Data

US 2006/0139479 A1 Jun. 29, 2006

(51) Int. Cl.
 *H04N 9/73* (2006.01)
 *G06K 9/00* (2006.01)
(52) U.S. Cl. .................................. 348/223.1; 382/167
(58) Field of Classification Search ............ 348/207.99, 348/221.1, 223.1, 224.1, 239, 370; 358/501, 358/505, 509; 382/162, 167, 168, 276, 284
See application file for complete search history.

(56) References Cited

U.S. PATENT DOCUMENTS

| | | | | |
|---|---|---|---|---|
| 3,893,166 | A * | 7/1975 | Pugsley | 358/523 |
| 5,914,748 | A * | 6/1999 | Parulski et al. | 348/239 |
| 6,038,339 | A * | 3/2000 | Hubel et al. | 382/162 |
| 6,088,479 | A * | 7/2000 | Ikeshoji et al. | 382/170 |
| 6,262,778 | B1 * | 7/2001 | Nonweiler et al. | 348/586 |
| 6,310,626 | B1 * | 10/2001 | Walker et al. | 345/589 |
| 6,570,612 | B1 | 5/2003 | Saund et al. | 348/218.1 |
| 6,738,154 | B1 * | 5/2004 | Venable | 358/1.15 |
| 6,853,464 | B1 * | 2/2005 | Ueda et al. | 358/1.9 |
| 6,961,461 | B2 * | 11/2005 | MacKinnon et al. | 382/164 |
| 6,980,231 | B1 * | 12/2005 | Ohsawa | 348/188 |
| 7,324,703 | B2 * | 1/2008 | DiCarlo et al. | 382/274 |
| 2002/0076219 | A1 * | 6/2002 | Uchino | 396/429 |
| 2002/0191214 | A1 * | 12/2002 | Shimazaki | 358/1.15 |

OTHER PUBLICATIONS

Günther Wyszrcki and W.S. Stiles, Color Science Concepts and Methods, Quantitative Data and Formulae. Second Edition, Wiley Classics Library Edition, Published 2000.

* cited by examiner

*Primary Examiner* — Chieh M Fan
*Assistant Examiner* — Carramah J Quiett (57) ABSTRACT

A method and system for processing images to, for example, capture artwork includes capturing a target image and an image of a reference. The reflectance functions of the target image are then measured. The target image is processed, using the measured reflectance functions and the captured image of the reference, to calculate a correction transform associated with the captured target image.

21 Claims, 8 Drawing Sheets

IMAGE PROCESSING METHODS AND SYSTEMS FOR FINE ART REPRODUCTION

BACKGROUND

The present invention relates generally to image processing techniques and systems and, more particularly, to image processing techniques and systems which can be used to reproduce fine art.

Fine art reproduction has been an area of interest and research for quite some time. Recently, commercial interest in such reproductions has increased due to the availability of affordable, high quality, large format printers that use archival inks and media. These printers enable print-on-demand systems for printing, e.g., poster-size reproductions of fine art (e.g., paintings in an art gallery) that can be customized by the consumer. Moreover, print-on-demand systems enable a much larger selection of available fine art reproductions since there is no need for maintaining a physical inventory of reproductions.

One challenge associated with these print-on-demand systems is the construction of a digital database of fine art material that faithfully represents the original art. To date it has been difficult and time-consuming to create such a large database. One of two approaches is typically implemented to address this problem. One approach is to use automated, hyperspectral systems. These systems capture, process and print more than three channels of spectral data to produce spectrally accurate reproductions. Spectral reproductions match the original artwork over many different illumination conditions and usually do not require manual color adjustments to produce a good match. Such systems, however are based on custom hardware that can be expensive and require trained operators, which limits their use to only the largest museums.

Another approach is to use hand-tuned colorimetric systems based on standard hardware which employs three-channel capture devices. These systems are more affordable, but the captured data must usually be manually adjusted to produce an acceptable reproduction of the fine art being imaged. The manual adjustment of each image requires both a skilled technician and patience, making these systems unfeasible for museums with large art collections.

Accordingly, it would be desirable to provide image processing techniques and systems for fine art reproduction which overcome these drawbacks.

SUMMARY

According to one exemplary embodiment of the present invention, a method for processing images includes the steps of capturing a target image, capturing an image of a reference, measuring reflectance functions of the target image and processing the target image, based on the measured reflectance functions and the captured image of the reference, to calculate a correction transform associated with the captured target image.

According to another exemplary embodiment of the present invention, an image processing system includes an image capture device for capturing a target image and a reference and a processor for processing the captured target image, based on measured reflectance functions of the target image and the captured image of the reference, to calculate a correction transform associated with the captured target image.

BRIEF DESCRIPTION OF THE DRAWINGS

The accompanying drawings, which are incorporated in and constitute a part of the specification, illustrate an embodiment of the invention and, together with the description, explain the invention. In the drawings.

DETAILED DESCRIPTION

The following description of the exemplary embodiments of the present invention refers to the accompanying drawings. The same reference numbers in different drawings identify the same or similar elements. The following detailed description does not limit the invention. Instead, the scope of the invention is defined by the appended claims.

Figure 1:
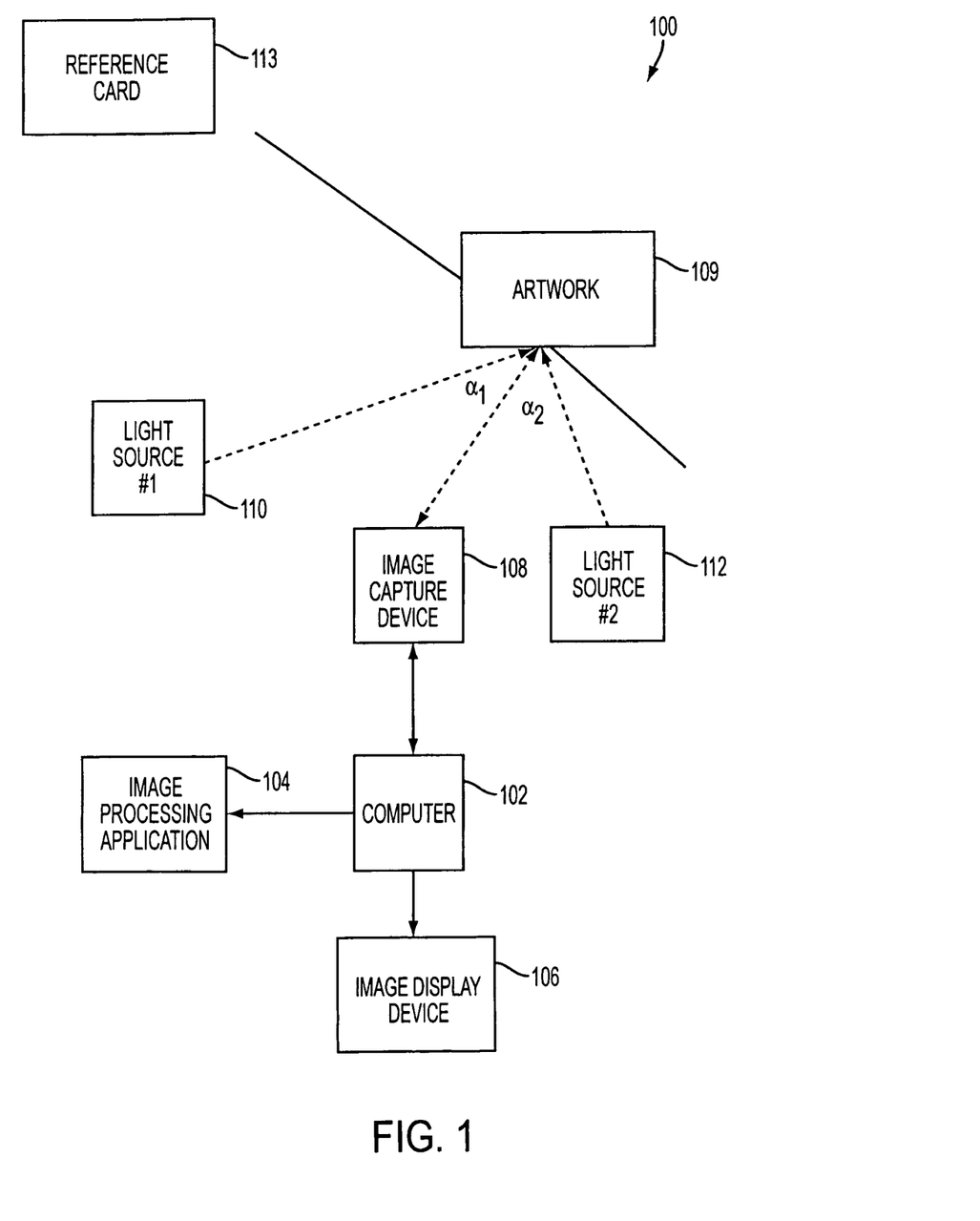
FIG. 1 illustrates a processing system in which exemplary embodiments of the present invention can be employed.
Figure 2A:
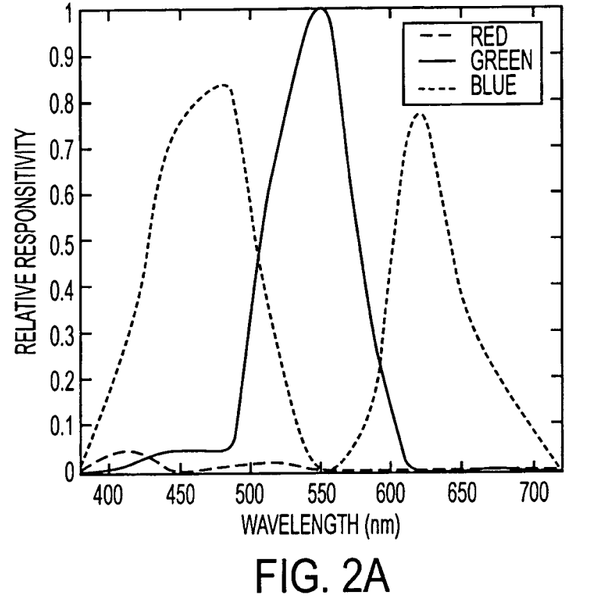
FIGS. 2(a)-2(d) illustrate exemplary system characterization data in accordance with exemplary embodiments of the present invention.
Figure 2B:
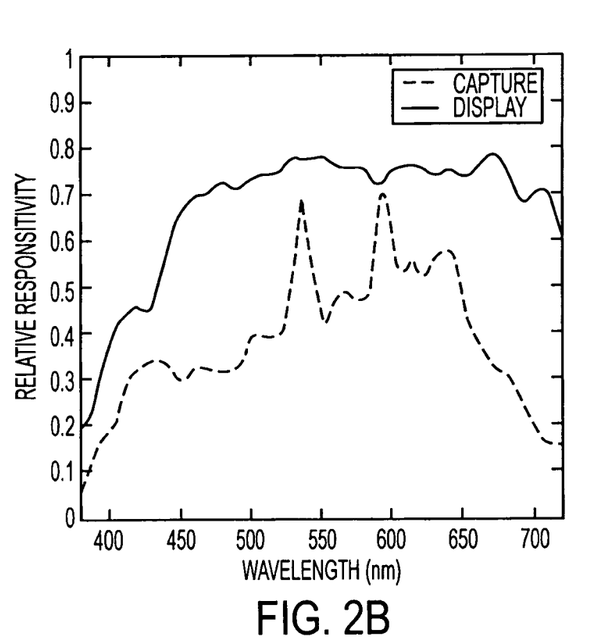
Figure 2C:
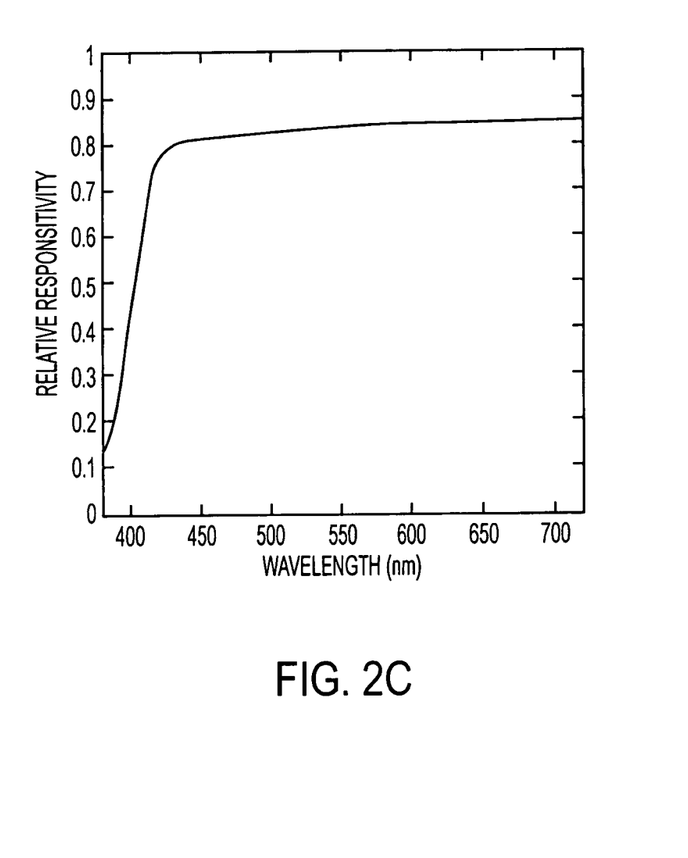
Figure 2D:
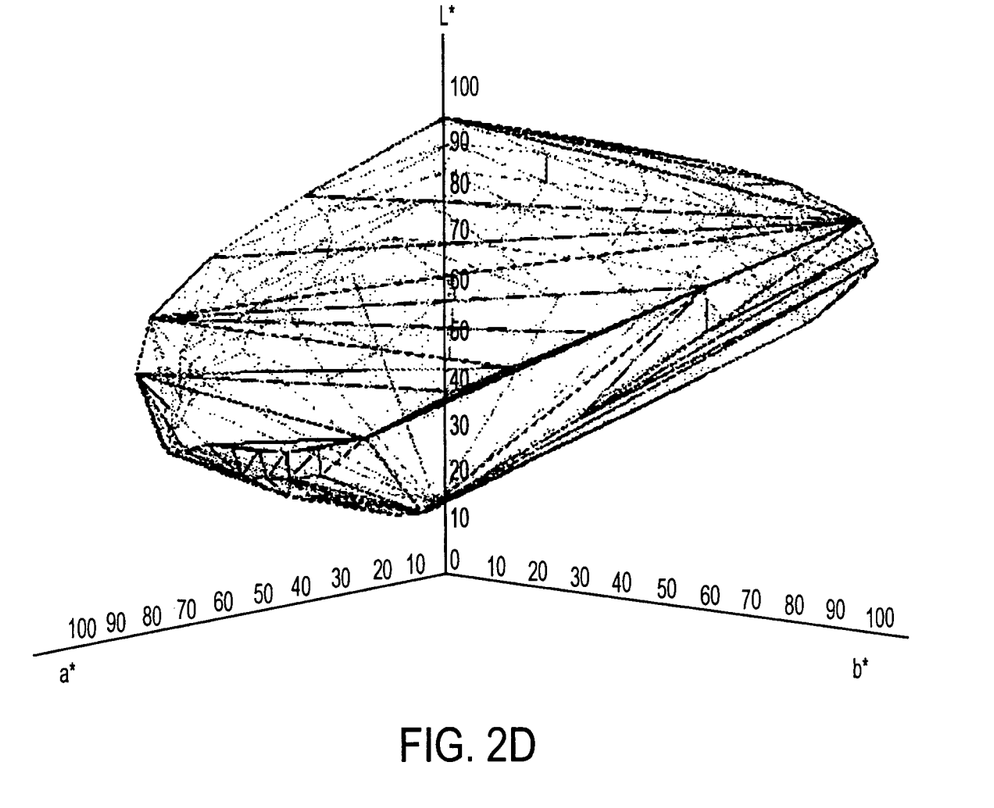

Prior to discussing techniques for image processing of artwork according to exemplary embodiments of the present invention, an exemplary system in which such techniques can be implemented is described below in order to provide some context. Referring to FIG. 1, an image processing system 100 includes a computer 102 having a processor, I/O interface and memory devices (not shown). The image processing system 100 further includes an image processing application 104 which interacts with the computer 102 to process captured artwork in a manner which is described in more detail below. An image display device 106, e.g., a printer, can be connected to the computer 102 for generating reproductions of the artwork. Alternatively, or in addition thereto, digital recordings of the artwork can be stored as digital records on removable media or circulated to a network of kiosks for reproduction at other locations. An image capture device 108, e.g., a digital camera, operates to capture images of artwork to be processed. The artwork 109, which can, for example, be a painting, a sculpture or any form of artwork, is illuminated by light sources 110 and 112. In this example, light sources 110 and 112 are placed such that they direct light toward the artwork at angles of approximately 45 degrees ($\alpha_1$ and $\alpha_2$), although it will be appreciated that more or fewer lights sources at different angles relative to the image capture device 108 can be employed. The system 100 also employs a reference card 113, e.g., a piece of stretched canvas, in a manner to be described below.

According to exemplary embodiments of the present invention, image processing methods and techniques for fine art reproduction employ standard hardware but require no manual color adjustments. These techniques provide for, among other things, (1) calorimetrically accurate reproductions, (2) device-independent workflow, (3) a simplified capture process, and (4) automated color processing. As a preliminary step, the devices involved in image capture and reproduction, e.g., image display device 106, image capture device 108, lights 110 and 112 and reference card 113, are evaluated to determine certain operating characteristics thereof. Characterizing these devices enables them to be freely exchanged for alternative devices and this information is also used to generate calorimetrically accurate reproductions as will be described below. This characterization data includes, for example: (1) the (three-channel) spectral responsivity functions of the camera ($r_R(\lambda), r_G(\lambda), r_B(\lambda)$), (2) the spectral reflectance function of the reference card ($S_{reference}(\lambda)$) (3) the spectral power distribution of the light used to illuminate the artwork ($e_{capture}(\lambda)$), (4) the spectral power distribution of the light used to display the reproduction ($e_{display}(\lambda)$), and (5) an ICC profile of the printer and media used to print the reproductions. The camera characterization can be measured using a monochromator or can be obtained from the manufacturer, while the other characterization data can be measured using a spectoradiometer. Examples of measured characteristics for a test system are shown in FIGS. 2(a)-2(d) for the camera, capture/display lights, reference card and image display device, respectively.

Figure 3:
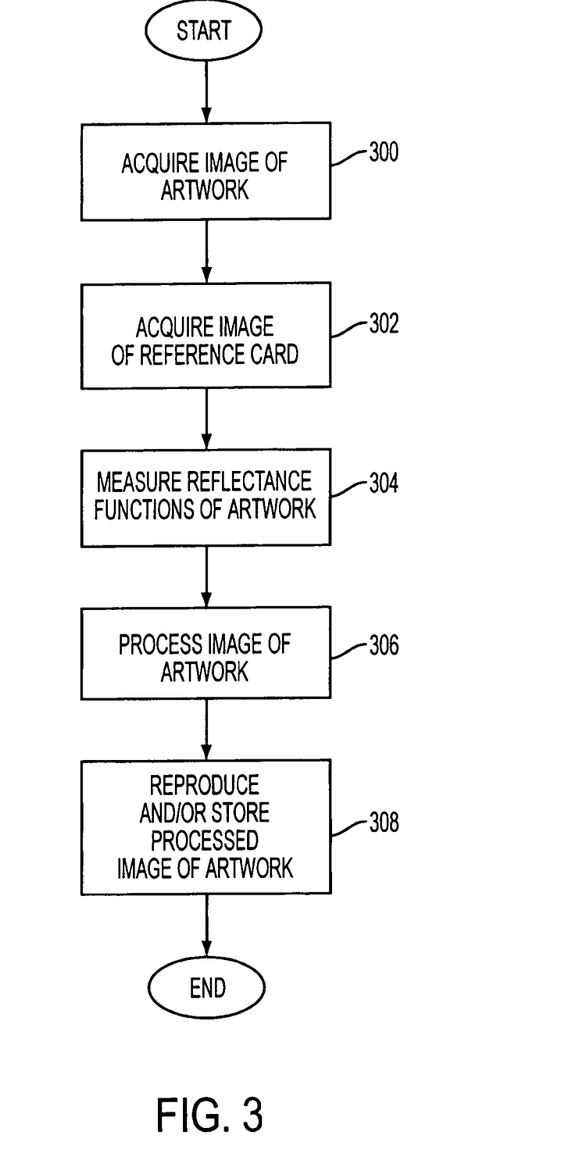
FIG. 3 illustrates a method of image processing in accordance with exemplary embodiments of the present invention.

Once the devices 106, 108, 110, 112 and 113 have been characterized, individual pieces of art can be captured and reproduced. An overall method for processing images according to the present invention is depicted in the flowchart of FIG. 3. Therein, at step 300, an image of the artwork is acquired using camera 108. Next, an image of the reference card 113 is acquired using camera 108. The reflectance functions of the artwork 109 are measured at step 304. Then, the captured image of the artwork 109 is processed by computer 102 in conjunction with image processing application 104. The resultant, processed image can then be reproduced using, e.g., image display device 106 and/or stored for later reproduction at step 308. Each of these steps will now be described in more detail.

Referring again to FIG. 3, the first step of this exemplary embodiment is to acquire an image of the artwork 109. Since it may be desirable to capture a large number of pieces of art, making the capture process as straightforward as possible significantly reduces the overall time associated with capturing a large collection. The lights 110 and 112 should be placed to avoid abrupt shadows falling on the artwork 109 and to minimize reflection of specular highlights from the artwork 109 back into the image capture device 108. This can be accomplished by, for example, placing the lights 110 and 112 at approximately a forty-five degree angle with respect to the image capture device 108 as shown in FIG. 1. The image capture device 108 can be focused on the artwork 109 with an exposure value that is set to capture the entire dynamic range of the artwork 109 and using the same white-balancing gain settings which were used to characterize the image capture device. Note that the image capture step 300 has been simplified according to exemplary embodiments of the present invention by removing several constraints including, for example, the need to properly expose, white-balance, color-correct or uniformly-illuminate the target artwork during the image capture. Furthermore, the image capture device 108 does not need to be precisely perpendicular to the artwork 109. Instead, these factors are automatically compensated for by the image processing application 104 as discussed below.

In step 302, an image of the reference card 113 is acquired. The reference card 113 can be any uniformly colored surface that is larger than the original artwork 109 including, for example, white canvas stretched to a frame or white poster board. The reference card 113 should be placed at the same location as the artwork 109, and the reference card 113 should be imaged without changes to the lighting geometry or image capture device settings. This enables the image processing application 104 to uniformity-correct and exposure-correct the artwork image based on, for example, spatial variations caused by non-uniform lighting captured in the reference card image generated during this step of the process. At step 304, after acquisition of the artwork and reference card images, spectral reflectance measurements of the artwork 109 are taken. These measurements can be taken manually using, for example, a handheld spectroradiometer. Typically, 30-40 measurements taken in a roughly grid-like pattern across the surface of the artwork are sufficient to provide data from which the artwork reflectance functions $s_{artwork}(\lambda)$ can be generated, e.g., by interpolating the spectral reflectance measurements.

Figure 4:
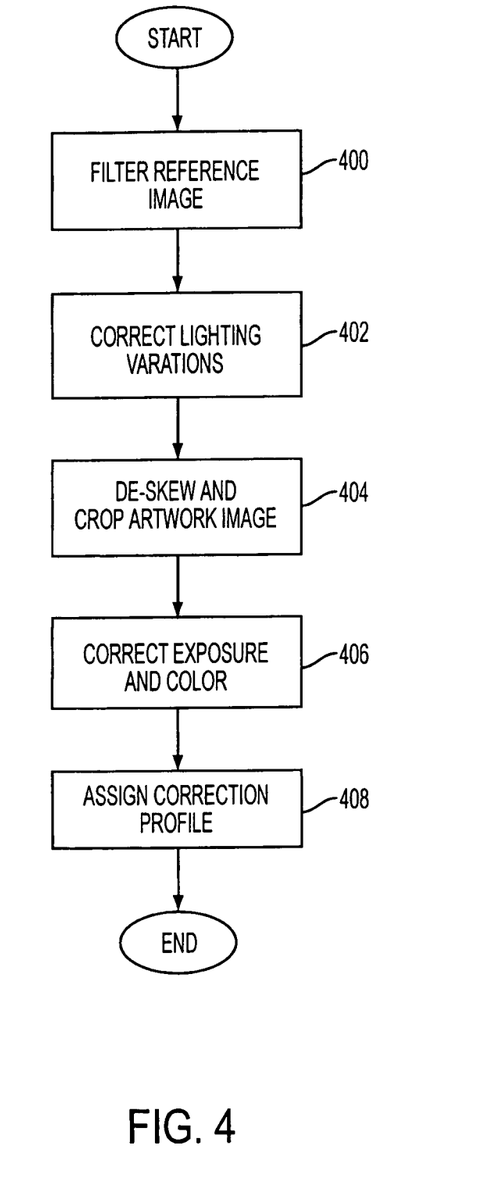
FIG. 4 is a flowchart illustrating one of the method steps of FIG. 3 in more detail.

The data developed in steps 300, 302 and 304, as well as the device characterization data, are then input to the image processing application 104 run on computer 102 in step 306. FIG. 4 shows exemplary steps associated with the image processing performed by image processing application 104. First, at step 400, the reference card image is low-pass filtered. Filtering is performed to reduce photon and sensor noise and also to reduce any small spatial variations in the reference image. Next, at step 402, lighting variations in the captured image are corrected. This can be accomplished by, for example, dividing the artwork image by the reference image on a pixel-by-pixel basis, e.g., the RGB value of a pixel at location (x,y) in the artwork image is divided by the corresponding RGB value at location (x,y) in the reference image, and the result is scaled by a scaling factor, e.g., $(2^{16}-1)/2$. The division of the artwork image by the reference image corrects for any non-uniformity in the illumination, and the scale factor maps the image to a desired format, e.g., a 16-bit format. In this exemplary embodiment, the full (e.g., $2^{16}-1$) scale factor is not applied because the reference card material usually is not a perfect reflector. Instead using, for example, a scale factor of $(2^{16}-1)/2$ allows pixels in the artwork 109 to be up to two times lighter than the reference 113 and without being clipped in the uniformity-corrected image. Those skilled in the art will appreciate that various scale factors can be employed.

The next step 404 performed by image processing algorithm 104 in this exemplary embodiment of the present invention is de-skewing and cropping of the uniformity-corrected artwork image. These functions can be performed automatically, manually or semi-automatically. These processes can reduce post-processing time but are, however, entirely optional and may be omitted in other exemplary embodiments. De-skewing corrects for geometric distortions in the image that may have occurred during the capture process, while cropping attempts to crop the image to be rectilinear.

Next, image processing algorithm 104 performs exposure-correction and color-correction as shown by step 406. These two operations can be combined into one step because they can be implemented using a single correction transform, e.g., matrix K, according to an exemplary embodiment of the present invention. Two sets of values are used to compute the matrix: (1) the simulated artwork image capture device responses after uniformity-correction ($RGB_{corrected}$) and (2) the desired artwork CIE L*a*b* values ($L*a*b*_{desired}$).

To compute the $RGB_{corrected}$ values, the image capture device responses for both the artwork 109 and the reference card 113 are simulated. The image capture device responses for the artwork ($RGB_{artwork}$) are simulated using the spectral power distribution of the capture illuminant ($e_{capture}(\lambda)$), the reflectance functions of the artwork ($s_{artwork}(\lambda)$) and the image capture device responsivity functions ($r_R(\lambda), r_G(\lambda), r_B(\lambda)$) as inputs to the imaging equation (1), set forth below.

$$RGB_{artwork} = \begin{bmatrix} R \\ G \\ B \end{bmatrix} = \int_\lambda s_{artwork}(\lambda) e_{capture}(\lambda) \begin{bmatrix} r_R(\lambda) \\ r_G(\lambda) \\ r_B(\lambda) \end{bmatrix} d\lambda \quad (1)$$

The image capture device responses to the reference card ($RGB_{reference}$) are simulated using the same quantities with the exception that the reference card reflectance function $S_{referencek}(\lambda)$ is used instead of the artwork reflectance functions $s_{artwork}(\lambda)$. These inputs are also provided to the imaging equation to generate the simulated $RGB_{reference}$ values as shown below.

$$RGB_{reference} = \begin{bmatrix} R \\ G \\ B \end{bmatrix} = \int_\lambda s_{reference}(\lambda) e_{capture}(\lambda) \begin{bmatrix} r_R(\lambda) \\ r_G(\lambda) \\ r_B(\lambda) \end{bmatrix} d\lambda \quad (2)$$

Then, using $RGB_{artwork}$ and $RGB_{reference}$, the simulated artwork image capture device responses after uniformity-correction ($RGB_{corrected}$) are determined by dividing the simulated artwork image capture device responses by the simulated reference card image capture device responses as $RGB_{corrected} = RGB_{artwork}/RGB_{reference}$.

To compute the desired artwork CIE L*a*b* values ($L^*a^*b^*_{desired}$), the CIE XYZ tristimulus values are first calculated by using the imaging equation (1) above and inputting the display illuminant spectral distribution $e_{display}(\lambda)$ the artwork reflectance functions $s_{artwork}(\lambda)$ and the observer responsivity functions $(x(\lambda), y(\lambda), z(\lambda))$ as:

$$\begin{bmatrix} X \\ Y \\ Z \end{bmatrix} = \int_\lambda s_{artwork}(\lambda) e_{display}(\lambda) \begin{bmatrix} x(\lambda) \\ y(\lambda) \\ z(\lambda) \end{bmatrix} d\lambda \quad (3)$$

The CIE 1931 standard observer responsivity functions are promulgated by the Commission Internationale De L'Eclairage (CIE) and are available from the commission or, for example, can be found in the book entitled "Color Science: Concepts and Methods, Quantitative Data and Formulae" by Wyszecki, G. and Stiles, W. S., the disclosure of which is incorporated here by reference. The CIE XYZ values calculated using equation (3) are then converted to CIE L*a*b* values by using the CIE defined equations for conversion from XYZ space, which equations are also provided in the above-incorporated by reference book. The display illuminant distribution is used in this exemplary embodiment of the present invention instead of the capture illuminant distribution to produce a reproduction that matches the original artwork under the specified display illuminant.

The combination exposure-correction and color-correction matrix (K) is next computed using the desired CIE L*a*b* values and the simulated image capture device responses after uniformity-correction. The matrix values are found using a non-linear search technique that minimizes the ΔE between the desired L*a*b* values and the image capture device estimated L*a*b* values. The image capture device estimated L*a*b* values are computed by transforming the corrected image capture device responses using the matrix and then converting the data to L*a*b* space using the display illuminant tristimulus values. The matrix that produces the lowest average ΔE between the desired L*a*b* values and the image capture device estimated L*a*b* responses is selected as the best exposure-correction and color-correction matrix. This can be written mathematically as finding the K that minimizes:

$$\|L^*a^*b^*_{desired} - xyz2lab(K \circ RGB_{corrected}, XYZ_{display})\|^2 \quad (4)$$

wherein K is a correction matrix, $L^*a^*b^*_{desired}$ is the desired reproduced pixel values from the perspective of an observer, $RGB_{corrected}$ is the simulated artwork image capture device responses after uniformity-correction, $XYZ_{display}$ are the display illuminant CIE tristimulus values and xyz2lab is a set of functions which transforms the CIE tristimulas values to CIE L*a*b* values, e.g., as described in the above-incorporated by reference book.

After the matrix is computed, each element in the matrix K is multiplied by an appropriate correction factor to compensate for the division performed in the lighting variation step 402, e.g., in the example provided above wherein a scaling factor of $(2^{16}-1)/2$ is employed, a correction factor of two would be applied to each element in the matrix K. This final exposure/color correction matrix K is then attached to the artwork image data as a correction profile, e.g., an International Color Consortium (ICC) profile, at step 408. The artwork image data that is stored can remain that which was captured by the image capture device 108 originally and can be transformed using the correction profile when the artwork image data is loaded into, e.g., an ICC enabled editor which will properly exposure-correct and color-correct the image values for display or reproduction.

Figure 5:
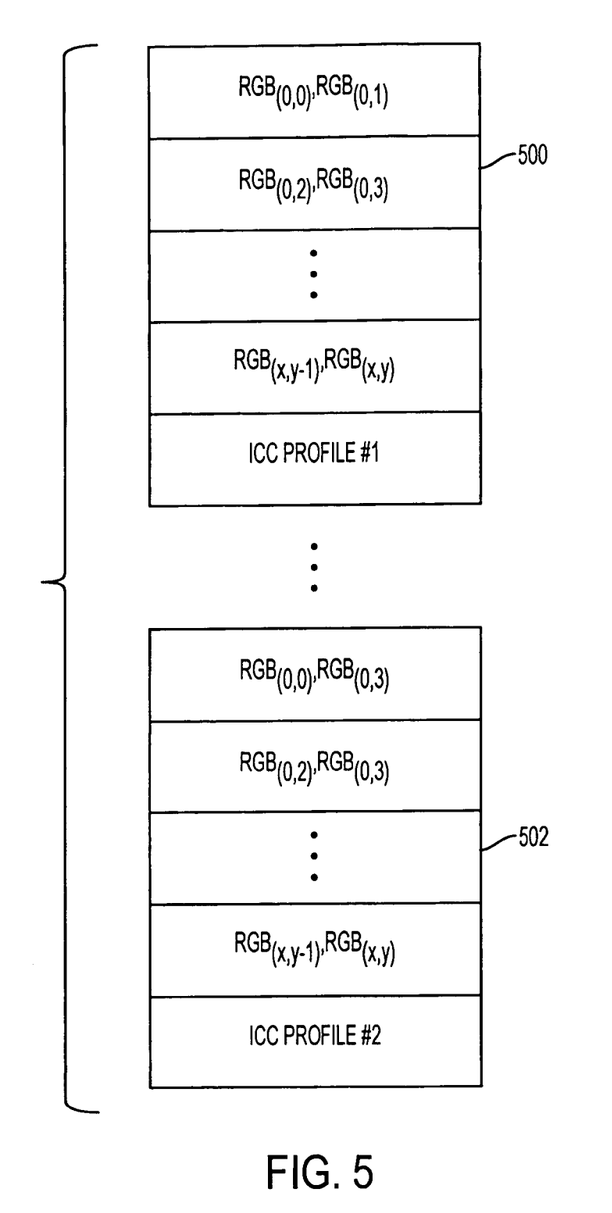
FIG. 5 illustrates data structures used to store processed images according to an exemplary embodiment of the present invention.

According to exemplary embodiments of the present invention, a color-correction matrix K can be computed for each piece of art that is imaged in the manner described above. This feature can be used for some exemplary embodiments because (1) most image capture devices are not within a linear transform of the human eye cones, and (2) the reflectance functions of artwork pigments have more linear dimensions than the number of color sensors on a standard image capture device. Thus, the accuracy of using a linear transformation can be improved by computing a different matrix for each piece of art. This feature of exemplary embodiments of the present invention is depicted conceptually by way of the data structure of FIG. 5. Therein, a first artwork 109 has been processed as described above and stored by computer 102 as a data structure 500, having a plurality of pixel values ($RGB_{(0,0)}$-RGB(x,y)) and a first ICC profile calculated as described above. A different piece of artwork has also been processed as described above, resulting in the data structure 502 which includes a plurality of pixel values and a second ICC profile. The first and second profiles will be different from one another based on their differing inputs to the exposure/color correction algorithm. Each data structure 500, 502 can be stored on a computer-readable medium including, for example, portable media (floppy disks, CDs, DVDs, flash memory devices, etc.) or fixed media (network storage devices, remote servers, etc.). In this way, the data structures 500, 502 can be retrieved from storage for reproduction.

Figure 6:
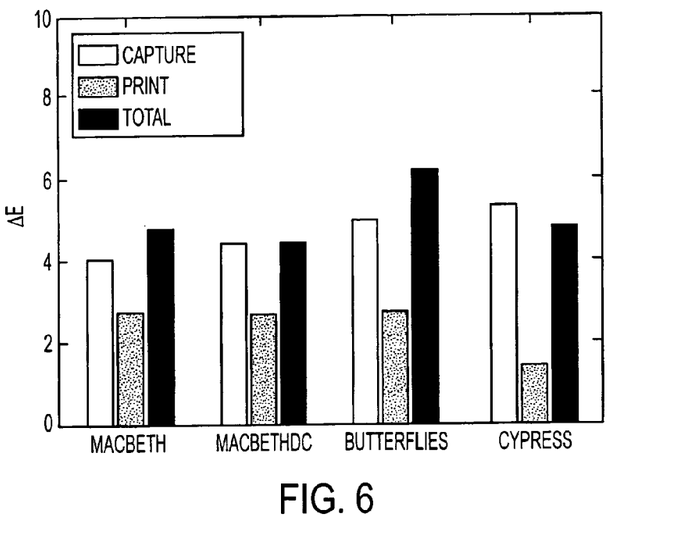
FIGS. 6 and 7 are graphs illustrating various results associated with exemplary embodiment of the present invention.

Exemplary fine art reproduction techniques, systems and data structures in accordance with the present invention have been tested on over fifty pieces of art. To illustrate the performance of these exemplary embodiments various paintings and charts were processed and reproduced in the manner described above, without manual color adjustments. FIG. 6 shows the average ΔE for four test images identified therein as "Macbeth", "MacbethDC", "Butterflies" and "Cypress". As will be appreciated by those skilled in the art, ΔE values are a standard way of conveying perception variances in reproduced colors. The Macbeth color chart is a chart having a standard grid (4 rows×6 columns) of test patches of different colors which can be used as test references for film and video reproductions. The white bars in the graph of FIG. 6 indicate the ΔE of the capture process. These values were computed by measuring the original artwork with a spectroradiometer and comparing the measured L*a*b* values with those computed from the captured image after being processed by image processing application 104. The gray bars indicate the ΔE of the print process. These values were computed by comparing the L*a*b* values in the captured image after processing by image processing application 104 with those measured using the spectroradiometer on the printed reproduction. Finally, the black bars in the graph of FIG. 6 indicate the ΔE of the entire reproduction process. These values were computed by comparing the measured L*a*b* values of the original artwork with the measured L*a*b* values of the printed reproduction of the artwork. Significantly, these ΔE values compare favorably with those which would be expected to result using more expensive equipment (e.g., six-channel equipment) than the three-channel equipment used to generate these results employing an exemplary embodiment of the present invention.

Figure 7:
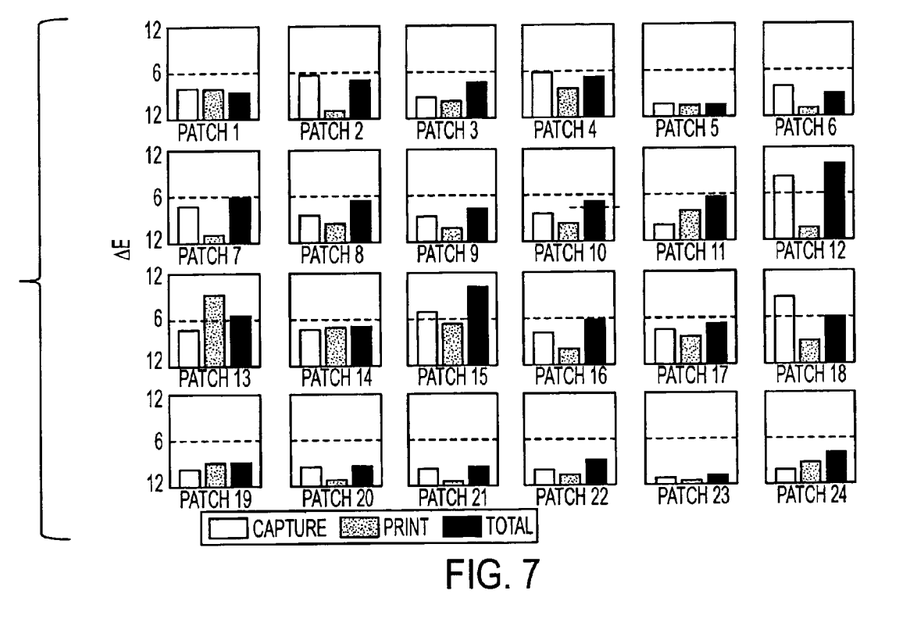

FIG. 7 shows the average ΔE for the individual patches of the Macbeth chart. As with FIG. 6, the white bars indicate the capture ΔE, the gray bars indicate the print ΔE, and the black bars indicate the total ΔE. The individual plots are formatted to mimic the layout of the Macbeth chart, i.e. the upper left plot corresponds to the "dark skin" patch (patch 1) of the chart and the lower right plot corresponds to the "black" patch of the chart (patch 24). From the graph of FIG. 7, it can be seen that the capture ΔE is highest for the "orange yellow" patch (patch 12) and the "cyan" patch (patch 18) colors and lowest for the neutral colors (e.g., patches 19-24), wherein patch 1 is the upper lefthand patch and patch 24 is the lower righthand patch. As with the results of FIG. 6, these ΔE values compare favorably with those which would be expected to result using more expensive equipment (e.g., six-channel equipment) than the three-channel equipment used to generate these results employing an exemplary embodiment of the present invention.

Exemplary embodiments of the present invention provide for a number of advantages with respect to the image processing of artworks for reproduction. For example, reproductions generated in accordance with the present invention closely match the original artwork under a specified display illuminant. Exemplary embodiments of the present invention do not require any specific image capture device, lights or image display device. The capture process of the present invention is simplified, and the color processing is completely automated. Thus, the present invention enables an affordable high-throughput fine art reproduction system that is easy to execute.

The foregoing description of exemplary embodiments of the present invention provides illustration and description, but it is not intended to be exhaustive or to limit the invention to the precise form disclosed. For example, although the foregoing exemplary embodiments refer to artworks as the target images for capture and reproduction, other types of images may be processed using the techniques, systems and data structures described herein. Moreover, although the aforedescribed exemplary embodiments referred to the calculation of a correction matrix, those skilled in the art will appreciate that other types of color correction transformation processes can be used instead of the exemplary matrix calculation described, e.g., non-linear or affine transformations. Modifications and variations are possible in light of the above teachings or may be acquired from practice of the invention. The following claims and their equivalents define the scope of the invention.

The invention claimed is:

1. A method for processing images comprising the steps of:
   capturing a target image using an image capture device;
   capturing an image of a reference using the image capture device;
   directly measuring reflectance functions of said target image with a measurement device; and
   processing said captured target image via a processor, said processing based on said directly measured reflectance functions and said captured image of said reference, to calculate a correction transform associated with said captured target image.

2. The method of claim 1, wherein said correction transform provides exposure correction and color correction for said captured target image.

3. The method of claim 1, further comprising the steps of:
   determining spectral responsivity of the image capture device;
   determining a spectral reflectance function of said reference; and
   determining spectral power distribution of light used to illuminate said target image during said step of capturing, wherein said spectral responsivity, spectral reflectance function and spectral power distribution are also used to process said target image to calculate said correction transform.

4. The method of claim 3, further comprising the step of:
   determining a spectral power distribution of light which will be used to illuminate a reproduction of said target image.

5. The method of claim 1, wherein said target image is an artwork.

6. The method of claim 5, wherein said reference is a piece of canvas.

7. The method of claim 1, further comprising the step of:
   storing a data structure associated with said captured target image, said data structure including data associated with pixel values of said captured target image and said correction transform.

8. The method of claim 1, wherein said step of processing said captured target image further comprises the step of:
   de-skewing and cropping said captured target image.

9. The method of claim 1, wherein said step of processing said captured target further comprises the steps of:
   computing, as said correction transform, a transform that produces a lowest average ΔE between desired L*a*b* values and image capture device estimated L*a*b* responses.

10. An image processing system comprising:
    an image capture device for capturing a target image and an image of a reference; and
    a measurement device for directly measuring reflectance functions of said target image; and
    a processor for processing said captured target image, based on said directly measured reflectance functions of said target image and said captured image of said reference, to calculate a correction transform associated with said captured target image.

11. The system of claim 10, wherein said correction transform provides exposure correction and color correction for said captured target image.

12. The system of claim 10, wherein said processor further uses a spectral responsivity of said image capture device, a spectral reflectance function of said image of said reference, and a spectral power distribution of light used to illuminate said target image while being captured to calculate said correction transform.

13. The system of claim 12, wherein said processor further uses a spectral power distribution of light which will be used to illuminate a reproduction of said target image to calculate said correction transform.

14. The system of claim 10, wherein said target image is an artwork.

15. The system of claim 14, wherein said reference is a piece of canvas.

16. The system of claim 10, wherein said processor stores a data structure associated with said captured target image, said data structure including data associated with pixel values of said captured target image and said correction transform.

17. The system of claim 10, wherein processor also de-skews and crops said captured target image.

18. The system of claim 10, wherein said processor further:
computes, as said correction transform, a transform that produces a lowest average ΔE between desired L*a*b* values and image capture device estimated L*a*b* responses.

19. A non-transitory computer-readable medium encoded with a computer program, containing instructions which cause a processing system to perform the steps of:
capturing a target image using an image capture device;
capturing an image of a reference using the image capture device;
directly measuring reflectance functions of said target image with a measurement device; and
processing said captured target image via a processor, said processing based on said directly measured reflectance functions and said captured image of said reference, to calculate a correction transform associated with said captured target image.

20. The non-transitory computer-readable recordable medium encoded with a computer program of claim 19, further containing instructions to cause the processor to perform the steps of:
computing, for each corresponding correction transform, a transform that produces a lowest average ΔE between desired L*a*b* values and image capture device estimated L*a*b* responses.

21. A system for processing images comprising the steps of:
means for capturing a target image;
means for capturing an image of a reference;
means for measuring reflectance functions of said target image; and
means for processing said captured target image, based on said measured reflectance functions and said captured image of said reference, to calculate a correction transform associated with said captured target image.

* * * * *